United States Patent [19]

Brandt

[11] 4,029,487
[45] June 14, 1977

[54] APPARATUS FOR PROTECTING VACUUM SOURCES INCLUDING VALVE WHICH ALTERNATELY COMMUNICATES WITH VACUUM AND ATMOSPHERE

[75] Inventor: J. Wayne Brandt, Lutherville, Md.
[73] Assignee: Spectroderm, Inc., Fairfax, Va.
[22] Filed: May 12, 1975
[21] Appl. No.: 576,477
[52] U.S. Cl. .................... 55/309; 55/170; 55/216; 55/417; 55/302; 55/385 C; 137/202; 137/205
[51] Int. Cl. ......................... B01d 46/42
[58] Field of Search ............ 55/164, 165, 166, 167, 55/168, 169, 170, 189, 97, 385 C, 216, 302, 417; 137/412, 205, 202; 251/68, 129, 131

[56] References Cited

UNITED STATES PATENTS

| | | |
|---|---|---|
| 383,901 | 6/1888 | Neu .................. 137/412 |
| 2,748,885 | 6/1956 | Day et al. ............ 55/165 |
| 2,835,270 | 5/1958 | York et al. ........... 137/412 |
| 3,314,219 | 4/1967 | Griffin et al. ........ 55/169 |
| 3,431,708 | 3/1969 | Moore ................ 55/168 |
| 3,538,682 | 11/1970 | Chattin et al. ....... 55/189 |
| 3,668,825 | 6/1972 | McIlvaine ............ 55/270 |
| 3,672,129 | 6/1972 | Strople et al. ....... 55/417 |
| 3,918,942 | 11/1975 | Rechsteiner et al. .. 55/385 |

OTHER PUBLICATIONS

Environmental Control Notes 3, dated Feb. 1972, Environmental Services Branch Div. of Research Natl. Ints. Health, pp. 1–4.

*Primary Examiner*—Bernard Nozick
*Attorney, Agent, or Firm*—Lawrence J. Winter

[57] ABSTRACT

An apparatus for protecting vacuum sources from contamination occasioned by aspiration of fluids or aerosols from a device operated by such vacuum sources, having an enclosed vessel in communication with the device, a filter in communication with the enclosed vessel to entrap aerosols and a vacuum-breaking valve alternately in communication with atmosphere & vacuum in communication with the filter to control the application of the vacuum by the vacuum source to the device. The vacuum-breaking valve is operated by a switch assembly mounted within the enclosed vessel and in electrical communication with a solenoid designed to operate a valve member within the vacuum-breaking valve.

5 Claims, 2 Drawing Figures

APPARATUS FOR PROTECTING VACUUM SOURCES INCLUDING VALVE WHICH ALTERNATELY COMMUNICATES WITH VACUUM AND ATMOSPHERE

BACKGROUND OF THE INVENTION

This invention relates to an apparatus designed to control the application of vacuum by vacuum sources to vacuum-operated devices and, in particular, to an apparatus designed to automatically protect such vacuum sources from contamination by aspiration of fluids or aerosols.

The use of vacuum pumps and similar vacuum sources in industrial, research and medical applications is widespread. For example, the aspiration of tissue culture media from cultures and of supernatants from centrifuge samples into collection vessels or reservoirs is a common procedure in many laboratories. The need for preventing accidental contamination of house vacuum systems or laboratory pumps by aerosols or fluids has long been recognized. Examples of prior attempts to protect such vacuum sources are desribed in "Environmental Control Notes," No. 3, February 1972, published by the Environmental Services Branch, Division of Research Services, National Institutes of Health. This publication describes previous systems and suggests the use of a disposable, cartridge-type filter to entrap submicron virus aerosols and protect the vacuum source from contamination. In connection with the filter, the use of a float-type vacuum break to prevent contamination by aspirated fluids is also suggested.

There are, however, significant disadvantages in using the above system. A float-type or gravity operated vacuum shutoff operation is not entirely reliable since it depends upon the ability of a rubber bulb to rise with the aspirated fluid and consistently seat itself so as to fluid-tightly stopper a Buchner funnel. The vacuum break does not occur until the fluid rises almost to the mouth of the funnel. In addition, there is no means of forcing the aspirated fluid back into the primary reservoir from the secondary reservoir, nor is the application of vacuum completely broken, only temporarily blocked.

SUMMARY OF THE PRESENT INVENTION

The present invention provides an apparatus for protecting vacuum sources from contamination occasioned by inadvertent aspiration of fluids or aerosols from devices operated by a vacuum source in a reliable and automatic manner, overcoming problems inherent in prior art devices. This invention provides for positive control and break of the vacuum and positive return of aspirated fluids to the primay reservoir.

It is, therefore, an object of the present invention to provide an apparatus for controlling the application of vacuum by a vacuum source to a vacuum-operated device and thereby protect the vacuum source from inadvertent contamination by aspirated fluids and aerosols.

It is a further object of the present invention to provide an apparatus having a valve means for positively controlling and breaking the application of vacuum by a vacuum source to a vacuum device.

It is one more object of the present invention to provide an apparatus having a switch assembly operating in response to aspirated fluids to actuate and operate a valve means to control application of vacuum by a vacuum source to a vacuum-operated device.

It is still another object of the present invention to provide an apparatus having a submicron filter in communication with a secondary reservoir containing a switching device, and with an electrically-operated valve means controlled by the switching device to prevent contamination of a vacuum source by fluids and aerosols accidentally aspirated from a vacuum device.

These and other objects of the present invention, which will become apparent from the following detailed description of a preferred embodiment of the invention, are achieved by use of a secondary reservoir in the form of an enclosed container or vessel which is in communication with a device operated by a conventional vacuum source and which receives fluids inadvertently aspirated from the vacuum-operated device. This secondary reservoir is in communication with a submicron-type filter, of conventional design, which is effective in entrapping and retaining aerosols and liquid particulate matter. This filter is in communication with a solenoid-operated valve interposed between it and the vacuum source. The solenoid of the valve is operated by a balanced lever-type switch assembly mounted on a fulcrum within a secondary reservoir for movement relative thereto. The introduction of fluid into the secondary reservoir will cause this switch assembly to be moved to operate the solenoid which, in turn, operates the valve to break communication to the vacuum source. When the vacuum is broken, communication is alternately opened to the atmosphere, which results in a back pressure which the apparatus, forcing fluids aspirated into the secondary reservoir back into the vacuum operated device.

The details of the preferred embodiment of this invention are shown more clearly with respect to the drawings wherein:

FIG. 1 is a vertical cross-sectional view of the apparatus of the present invention showing vacuum being applied through this apparatus; and, FIG. 2, is a vertical cross-sectional view of the present invention, similar to that shown in FIG. 1, where the apparatus of the present invention has operated to control and prevent the application of vacuum by the vacuum source to the vacuum operated device.

DESCRIPTION OF THE PREFERRED EMBODIMENT

Figure 1:
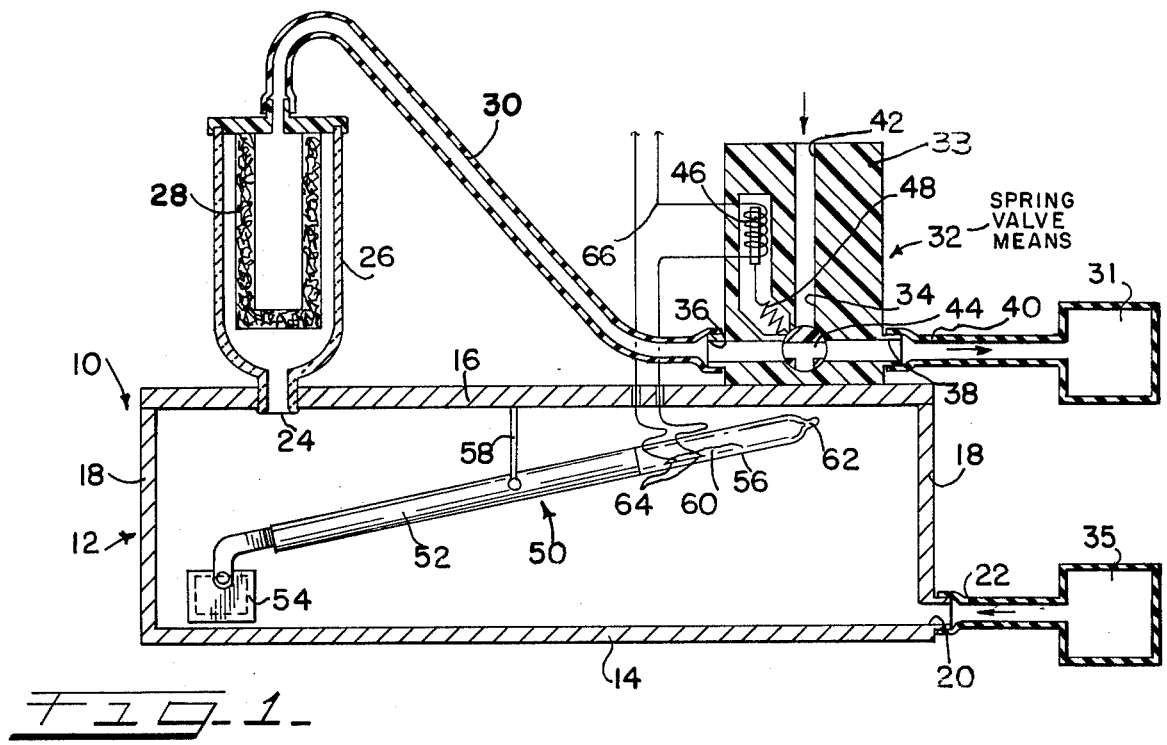

Referring now to the drawings, and, in particular to FIG. 1, the apparatus for protecting a vacuum source from contamination is shown in general at 10. This apparatus 10 includes an enclosed fluid-tight vessel, 12, which is shown to be generally rectangular in configuration, but may be any desired shape which accomplishes the purposes set forth herein. This vessel, 12, formed by bottom wall 14, top wall 16, and side walls 18, and has an inlet port 20 near its bottom which is connected by a suitable conduit such as a flexible hose or tubing 22, to the device to be operated by the vacuum. Such devices are of many different kinds and may be collection vessels or reservoirs. Therefore, vessel 12 is often designated as a "secondary reservoir." Vessel 12 preferrably has an outlet port 24 formed in top 16 which receives or is in communication with a commercially available biological filter 26. The biological filter 26 contains a submicron filter media 28 on the order of approximately .30 microns which entraps any aerosolized contaminants escaping from the vessel or reservoir 12. Filter 26 will also entrap, in the event of a catastrophic failure, liquid-born particulate matter.

The outlet end of filter 26 is in communication, through a second conduit 30 similar to the conduit 22, with a valve means 32 designed to control the application of a vacuum by the vacuum source 31, through the entire apparatus, to the vacuum operated device 35. Valve means 32, as shown in FIG. 1, includes a generally solid body 33, of cylindrical or rectangular configuration, having a T-shaped passageway 34 formed therein. Body 33 of valve means 32 has an inlet port 36 in communication with the filter 26 and vessel 12 through conduit 30, a first outlet port 38 in communication through a flexible conduit 40 with the vacuum source (not shown) and a second outlet port 42, in communication with the atmosphere, as will be explained below.

Figure 2:
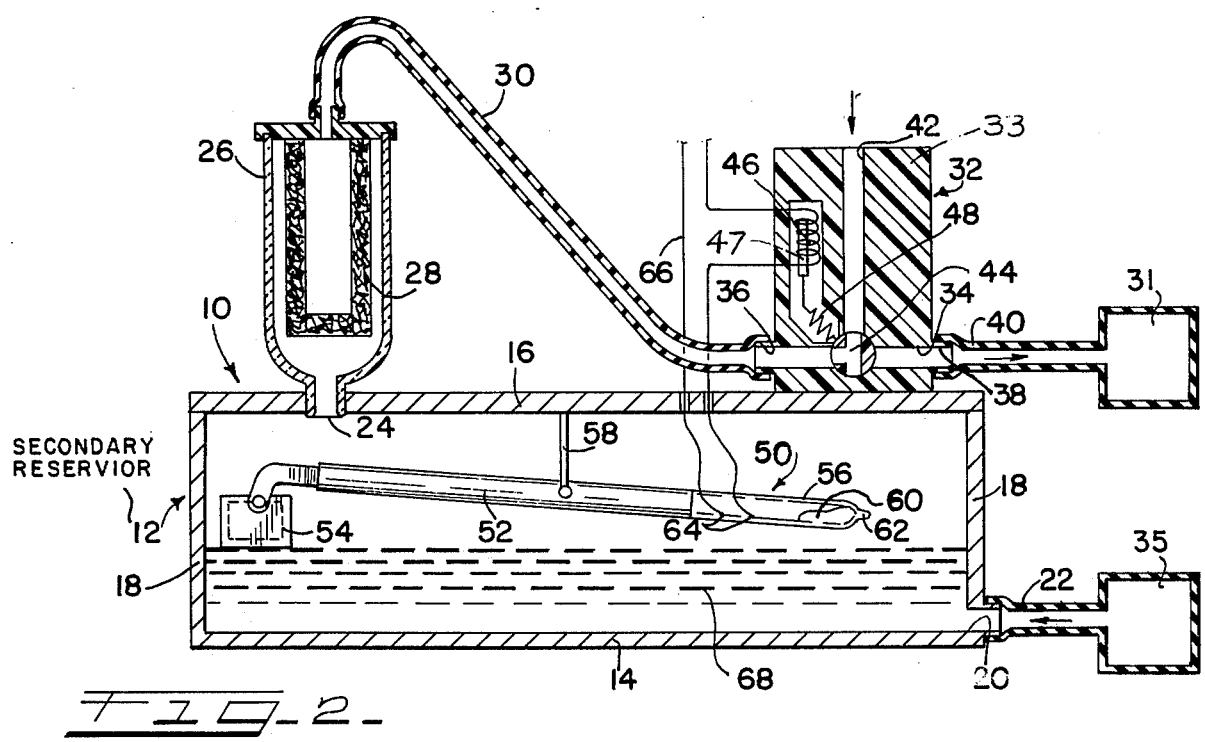

Valve means 32 thereby forms what is commonly known as a two-way valve to provide alternate communication between the vacuum operated device and the vacuum source or the atmosphere by connecting the inlet 36 and to first outlet port 38 or second outlet port 42, respectively, according to the movement of a T-shaped rotatable valve member 44 to the respective positions shown in FIGS. 1 or 2. Valve member 44 is operated in this preferred embodiment by an electrically energized solenoid 46, of conventional design, having a coil and an armature. A spring 48 tends to bias the solenoid connected to valve member 44 to a position where, in the unenergized state, the valve is normally closed to the vacuum source to break the application of vacuum by the vacuum source to the vacuum device. It is clear that valve means 32 could include various valve body configurations such as spools, and different operators such as pneumatic and mechanical could be used in place of the solenoid.

In the preferred embodiment shown in the drawings, valve means 32 is operated by a switch assembly 50, which is mounted on a downwardly extending fulcrum 58 within the enclosed vessel or secondary reservoir 12, and is freely movable therein in response to any fluids which may enter the reservoir, to ultimately interrupt the vacuum by causing the position of the valve member 44 within the valve means 32 to be moved by the solenoid 46. Again, while it is contemplated that switch assembly 50 could be mechanically connected to the valve member 44 within the valve means 32, it is preferred, for simplicity and reliability, that it form a portion of an electrical circuit in connection with an electrically operated solenoid valve to interrupt the vacuum when necessary.

In this embodiment, therefore, switch assembly 58 includes an elongated lever arm 52 having a float 54 mounted near one end thereof and a mercury switch 56 mounted near the opposite end thereof. A mercury pool 60 is movable near the opposite end thereof. A mercury pool 60 is movable within a container 62, as is normal in mercury switches. The elongated lever arm itself is balanced on a fulcrum 58 extending from the top 16 of vessel 12. Fulcrum 58 could, of course, be extended upwardly from the bottom of the vessel or could be of any suitable form which would generally serve to balance the lever arm and allow the arm to be rotated upwardly in response to a rising level of fluid within the vessel 12. At the inward end of container 62, are disposed a pair of electrical contracts 64, which may be simultaneously closed by the mercury pool 60 in the position shown in FIG. 1, to form a circuit between the electrical power source and the electrically energized solenoid 46 of the valve means 32.

In normal operation of the vacuum operated device, the enclosed vessel or secondary reservoir 12 is dry, allowing float 54 to rest on the bottom 14 of the vessel 12 and causing the mercury pool 60 within the mercury switch container 62 to be disposed at the inward or "contact" end of container 62 in such a position that it covers contacts 64 and makes an electrical circuit connection therebetween. As shown in the drawings, the line voltage is thus supplied from a typically available power source (115 VAC, 60 cps) through the closed contacts 64, to the solenoid 46. This causes the armature 47 of the solenoid to move against the force of spring 48, which normally biases valve member 44, and the armature connected thereto, to the position shown in FIG. 2. As is evident in FIG. 2, T-shaped valve member 44 communicates inlet 36 through second oulet port 42 to the atmosphere and subjects the internal system to atmospheric pressure. In the energized state of the solenoid shown in FIG. 1, however, that is, when the mercury pool 60 closes the contacts 64, the valve member 44 is moved to the position shown therein to communicate inlet port 36 with first inlet port 38 and thereby provide a vacuum through the system.

Thus, in normal operation, when the vessel 12 is dry, the vacuum source (not shown) is connected through conduit 40, outlet port 38, passageway 34, inlet port 36, second conduit 30, filter 28 and secondary reservoir 12 to the vacuum operated device (not shown). In this normal mode of operation, any aerosols that enter the reservoir 12 from the vacuum operated device will be entrapped by the filter media 28 of the biological filter 26 protecting the valve means 32 of the vacuum source from contamination.

In the event that liquids enter the secondary reservoir 12 from the vacuum operated device, the upward force of the rising liquid on the buoyant float 54 will counter balance the float arm 52 to a position similar to that shown in FIG. 2. Once past the horizontal, the mercury pool 60 in mercury switch 56 will flow away from contacts 64 thereby breaking the electrical connection to the solenoid 46 of valve means 32 and deenergizing the solenoid. In this unenergized state, the force of spring 48 will move the valve member 44 to the position shown in FIG. 2, whereby the inlet port 36 is communicated through second outlet 42 to the atmosphere. Atmospheric pressure is thereby applied through valve means 32, conduit 30, and filter 26 to the secondary reservoir 12 to force any liquids or fluids accumulated therein back into the vacuum operated devices.

As such liquid leaves reservoir 12, float 54, due to a slight over balancing of lever arm 52, will return to its rest position shown in FIG. 1. However, the solenoid 46 will retain its unenergized state and valve 32 will remain open to the atmosphere because of the hysterisis of the mercury pool 60, which remains near the opposite end of the mercury switch 56 from the contacts 64. To return to normal operation, therefore, the device, including the vessel 12 and switch assembly 50 must be tilted by the person operating the system toward the float end of the switch assembly to cause the mercury pool 60 to again flow to the contact end and reinstitute the electrical circuit with the solenoid of the valve. This fail safe feature of the present invention prevents the accidental reinitiation of the operation of the system without a positive act by the researcher or operator. The application of atmospheric pressure when the vacuum is interrupted also causes a positive evacuation of the reservoir 12 of any fluid without timely and costly delays and the disassembling of the system to remove such accumulated fluid, which is required by most prior art devices.

The present invention has been developed to provide constant air filtration of vacuum lines and a positive interrupt of the applied vacuum should undesired fluids be drawn toward the source of vacuum. While the invention has been described in relation to a preferred embodiment thereof, it will be apparent to those skilled in the art that the structural details are capable of wide variation without departing from the principles of the invention.

I claim:

1. An apparatus for protecting vacuum sources from contamination occasioned by inadvertent aspiration of liquidborne matter or aerosols from a device operated by a vacuum source comprising, an enclosed reservoir vessel with an inlet in the bottom thereof, a vacuum operated device in communication with said inlet, said vessel having an outlet in the top thereof, a filter housing secured to said outlet and forming an inlet to said housing, an outlet in said housing, filter means disposed between the housing inlet and outlet to filter air passed therethrough, a vacuum source, conduit means connecting said source with said filter housing outlet, a two-way valve disposed in said conduit means for communication with said vacuum source or the atmosphere, and a fulcrum disposed in said reservoir vessel and an elongated switch member connected to said fulcrum in said reservoir vessel and balanced thereby so its opposite ends are vertically movable in a see-saw manner and operatively connected to said two-way valve to communicate it to the atmosphere when the liquid level in said vessel reached a predetermined level, and biasing means normally urging said valve in a closed position and in communication with said vacuum source.

2. The apparatus of claim 1 wherein said switch member is an electrically energized solenoid.

3. The apparatus of claim 2 wherein a float is connected to one end of said elongated switch member in said vessel.

4. The apparatus of claim 3 wherein said elongated switch member is hollow and disposed on the fulcrum adjacent its midportion and is filled with a portion of mercury.

5. The apparatus of claim 4 wherein said valve and solenoid and biasing means are disposed in a housing through which said conduit passes.

* * * * *